US008094390B2

(12) United States Patent
Liu

(10) Patent No.: US 8,094,390 B2
(45) Date of Patent: Jan. 10, 2012

(54) ELECTRONIC DEVICE WITH REMOTE CONTROL CAPABILITY

(75) Inventor: Zhi-Hua Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/787,809

(22) Filed: May 26, 2010

(65) Prior Publication Data

US 2011/0127449 A1 Jun. 2, 2011

(30) Foreign Application Priority Data

Dec. 2, 2009 (CN) .......................... 2009 1 0310757

(51) Int. Cl.
*G02B 7/02* (2006.01)

(52) U.S. Cl. ....................................... 359/811; 359/819

(58) Field of Classification Search .................. 359/811, 359/819

See application file for complete search history.

(56) References Cited

U.S. PATENT DOCUMENTS 4,667,270 A * 5/1987 Yagi .............................. 361/820

* cited by examiner

*Primary Examiner* — Ricky Mack
*Assistant Examiner* — James Jones
(74) *Attorney, Agent, or Firm* — Altis Law Group, Inc.

(57) ABSTRACT

An electronic device includes a housing, a PCB, a LED mounted to the PCB, and a support member. The housing defines a cavity, and a through hole communicating with the cavity. The PCB is received in the cavity. The LED includes a lens received in the through hole. The support member, which is fixed to the housing to provide support for the lens, includes an elastic latch arm extending close to the through hole to form an angle with a surface of the lens. An end of the elastic latch arm contacts the surface of the lens to prevent the lens from being detached from the through hole.

6 Claims, 6 Drawing Sheets

ELECTRONIC DEVICE WITH REMOTE CONTROL CAPABILITY

BACKGROUND

1. Technical Field

The present disclosure relates generally to electronic devices, and particularly, to an electronic device having a remote control capability.

2. Description of Related Art

There are a very large number of commercially available electronic devices having a remote control capability to control other electronic apparatuses by emitting an infrared signal. For example, in a home theater environment, users may use a remote control to control a stereo sound system, a television, a video cassette recorder (VCR), and a digital video disc player (DVD) independently.

A typical electronic device with a remote control capability includes a housing, a printed circuit board received in the housing, an infrared communication LED fixed on the printed circuit board. The housing defines a through hole. The LED is received in the through hole and extruded from the housing. However, the LED is prone to be detached from the housing by an external force accidentally, thus causing a malfunction of the electronic device.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
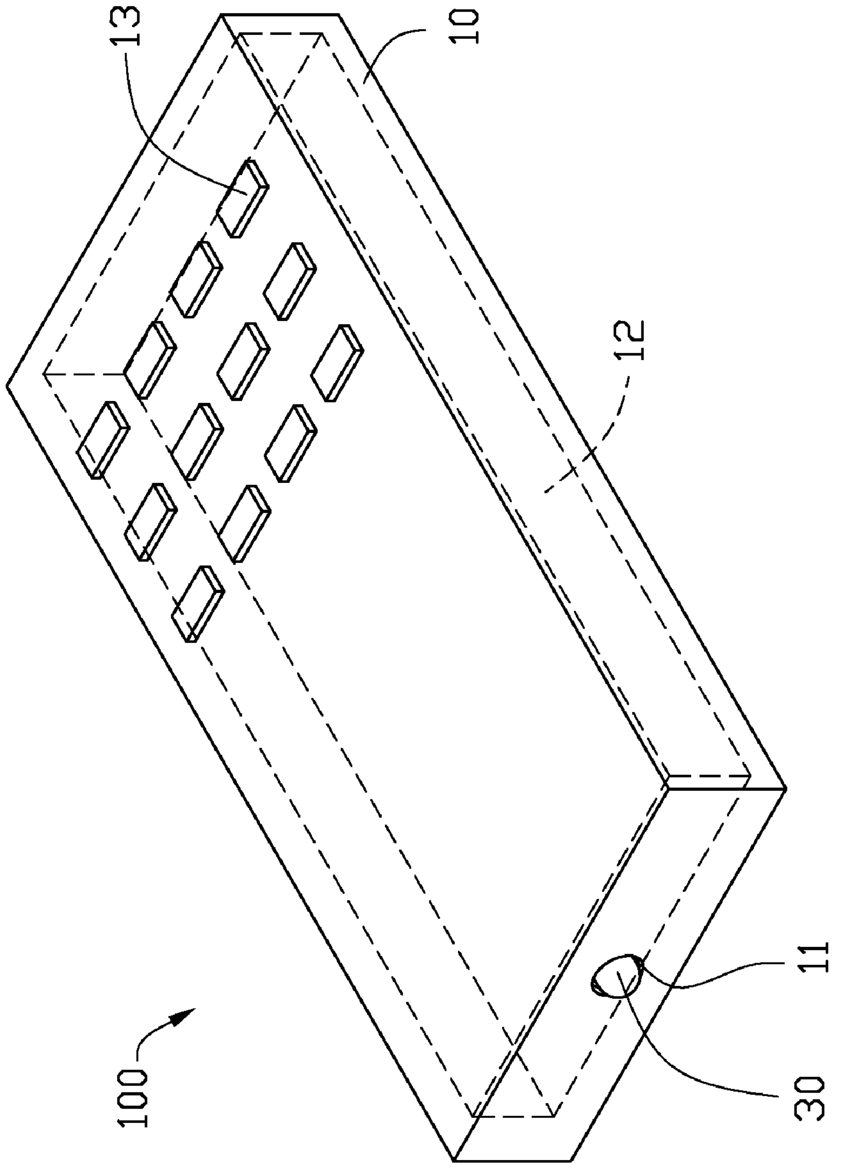
FIG. 1 is an isometric view of one embodiment of an electronic device.
Figure 2:
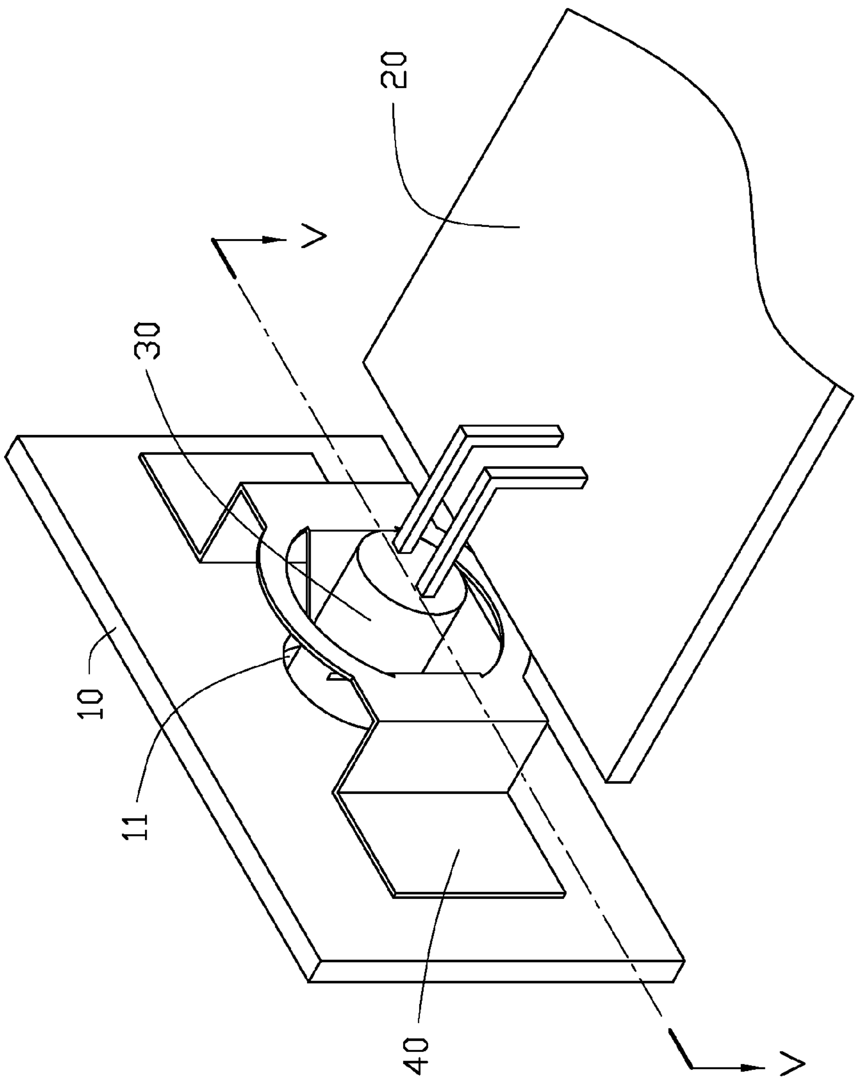
FIG. 2 is a partial, isometric view of the electronic device of FIG. 1, viewed from another aspect.

Referring to FIGS. 1 and 2, one embodiment of an electronic device 100 includes a housing 10, a printed circuit board (PCB) 20, and a light-emitting diode (LED) 30 mounted to the PCB 20. The housing 10 defines a cavity 12 to receive the PCB 20. The housing 10 further defines a through hole 11 on a front side of the housing communicating with the cavity 12 to receive the LED 30. The electronic device 100 further includes a keyboard 13 positioned on a side of the housing 10. The electronic device 100 may be a remote control for household appliances, or a mobile phone, or an electronic key for a car. In the illustrated embodiment, the electronic device 100 is a remote control, and the LED 30 is an infrared communication LED.

Figure 3:
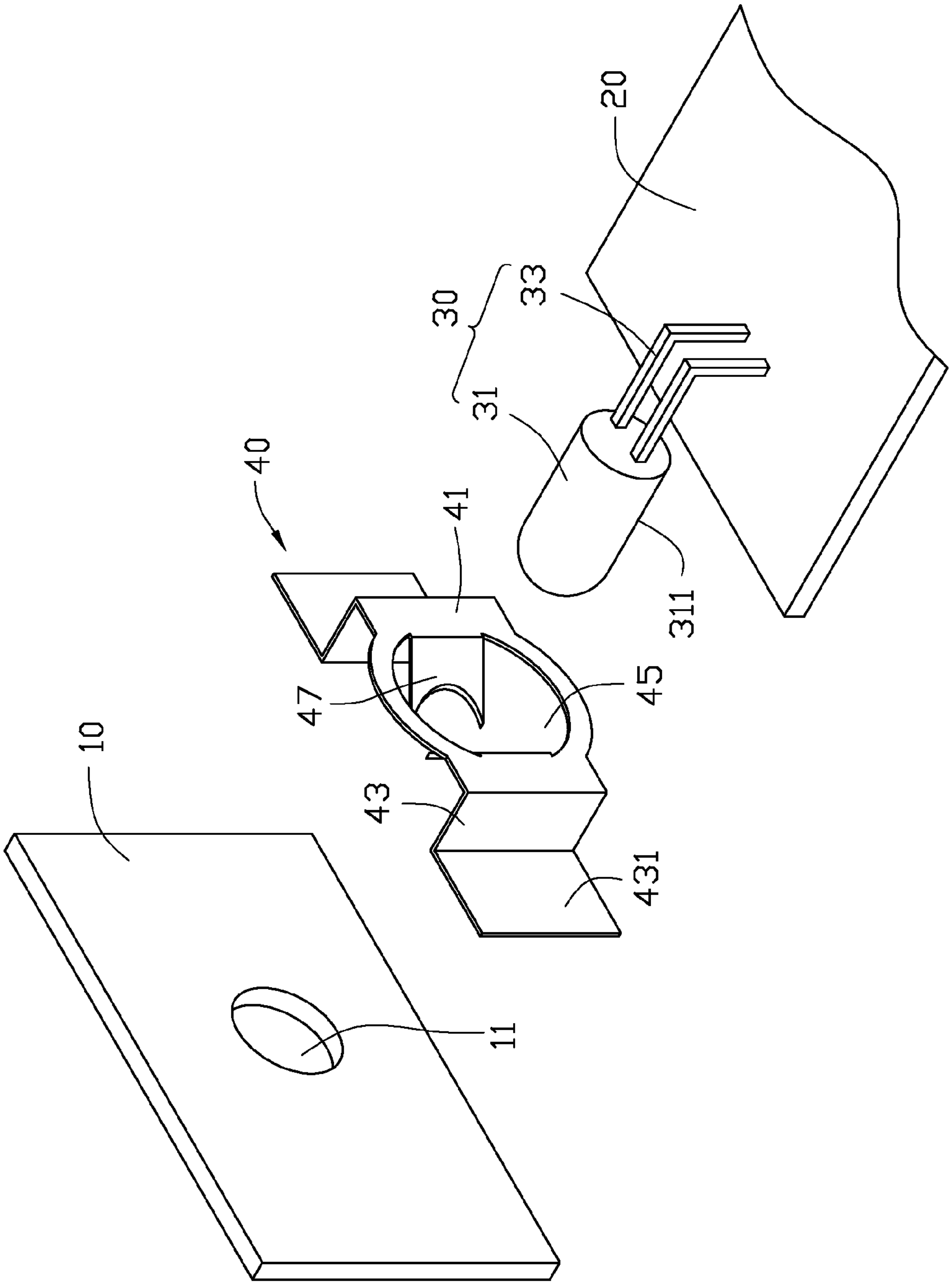
FIG. 3 is a partial, exploded, isometric view of the electronic device of FIG. 2, the electronic device including a support member.

Referring to FIG. 3, the LED 30 includes an LED chip (not shown), a lens 31 made of resin sealing the LED chip, and two lead terminals 33 extending from a side of the lens 31. The lens 31 is substantially bullet-shaped, and has a curved surface 311. An end of each lead terminal 33 is bent and welded to the PCB 20.

Figure 4:
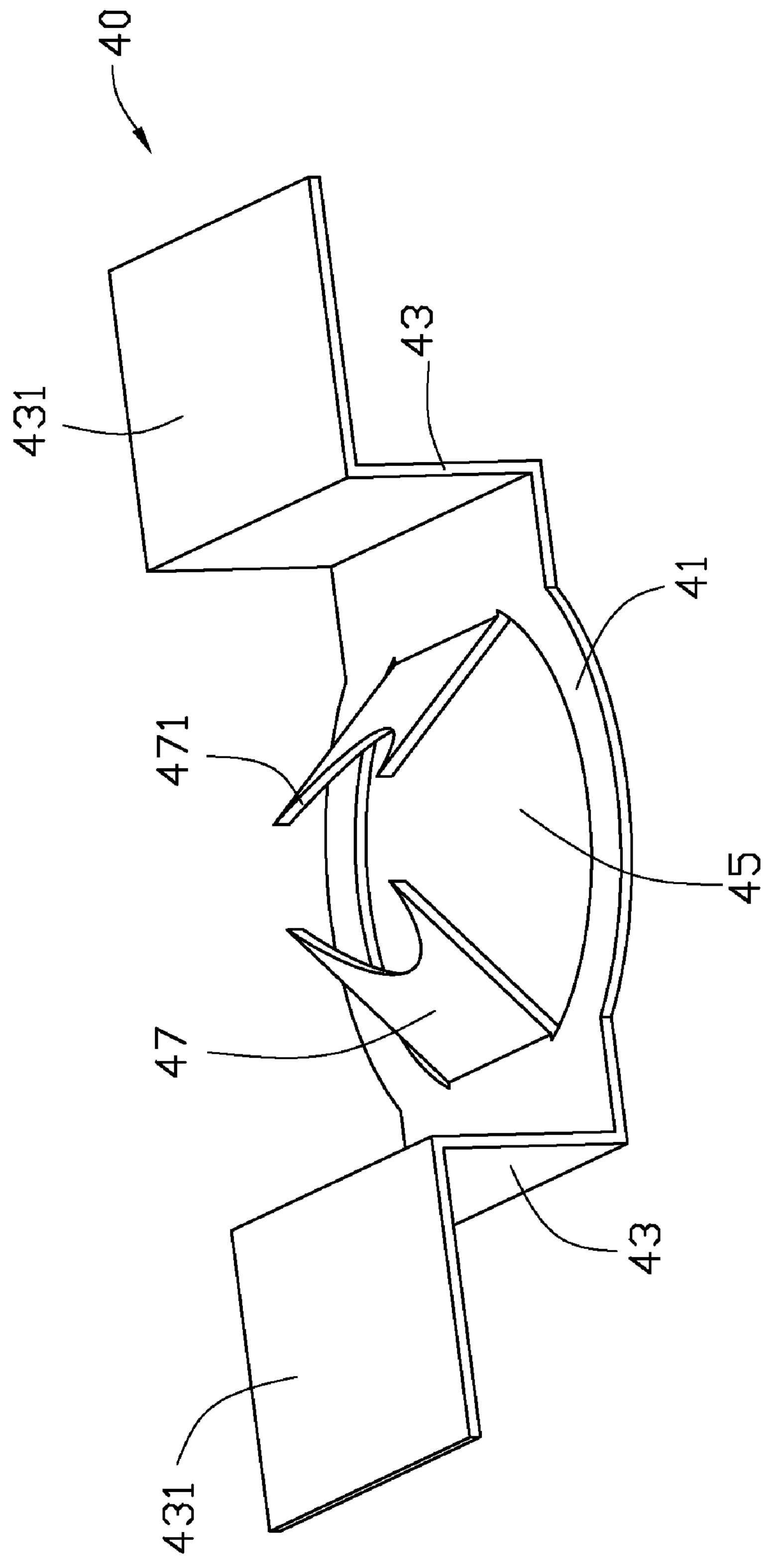
FIG. 4 is an enlarged, isometric view of support member of FIG. 3.

Referring also to FIG. 4, the electronic device 100 further includes a support member 40 fixed on an interior side of the housing 10 to provide support for the lens 31 of the LED 30. The support member 40, which is made of elastic materials, includes a main body 41, two operation portions 43, and two fixing portions 431, and two elastic latch arms 47. The main body 41 is substantially annular, and defines a substantially round positioning hole 45 in a middle portion to receive the lens 31. Two operation portions 43 extend substantially perpendicular to opposite ends of the main body 41 towards the housing 10. Each fixing portion 431 extends substantially perpendicular to an end of one operation portion 43 away from the main body 41. Two elastic latch arms 47 extend slantwise from a sidewall of the positioning hole 45 towards a center of the positioning hole 45, and face each other. Each elastic latch arm 47 includes a free end 471 configured to contact the surface 311 of the lens 31. The free end 471 has the same shape as the surface 311, and is substantially arcuate in the illustrated embodiment.

Figure 5:
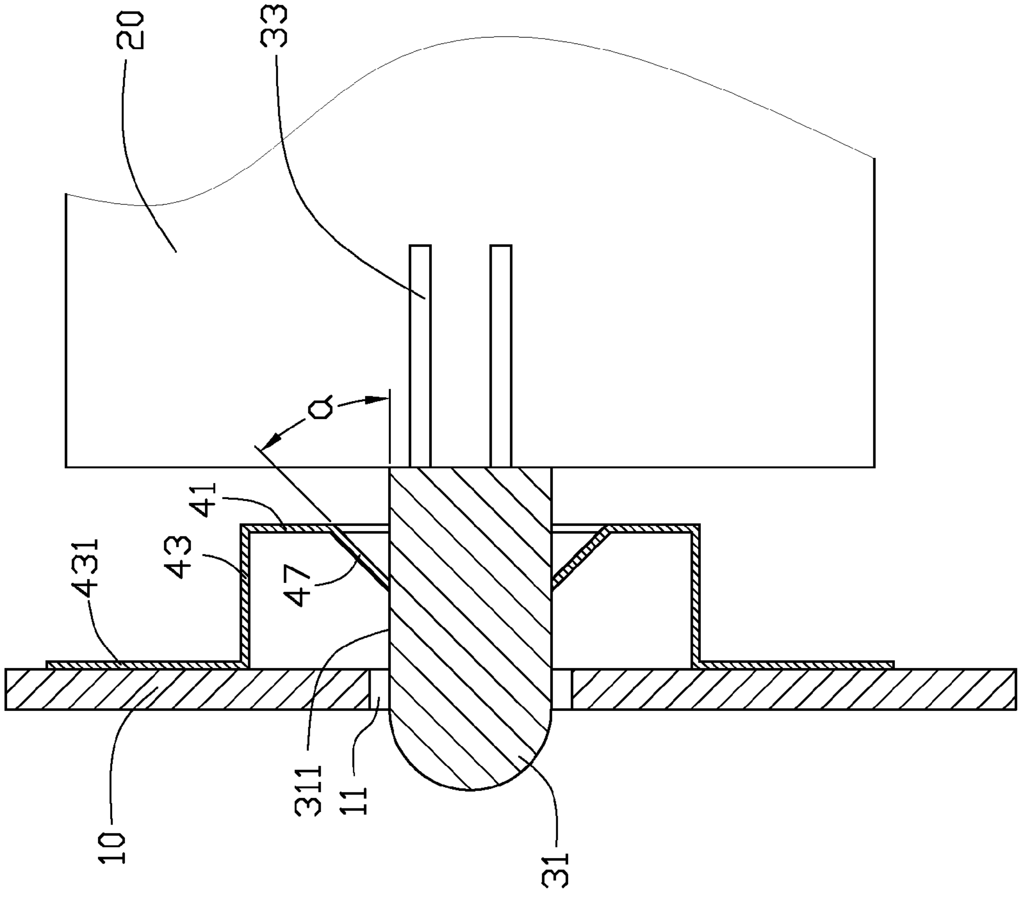
FIG. 5 is a cross-section of the electronic device in FIG. 2 taken along line V-V.

Referring to FIG. 5, the elastic latch arm 47 is angled close to the through hole 11, and an angle $\alpha$ defined by the elastic latch arm 47 and the surface 311 of the lens is about 30° to 60°, in this embodiment the angle is 45°.

In assembly, the two fixing portions 431 of the support member 40 are attached to the interior side of the housing 10 by gluing or welding, and the positioning hole 45 is aligned with the through hole 11. The PCB 20 is then received inside the cavity 12, and the lens 31 of the LED 30 extends through the positioning hole 45 and the through hole 11, to be exposed from the housing 10. At this moment, two elastic latch arms 47 firmly clip the lens 31 from opposite sides thereof, to restrict the movement of the lens 31 relative to the housing 10.

In use, the electronic device 100 may fall to the ground, or impact with other objects, resulting in vibration or violent shock to the lens 31 particularly along an axis of the through hole 11. Then, the elastic latch arms 47 clip the lens 31 even more because of the angle $\alpha$ defined by the elastic latch arm 47 and the surface 311, to prevent the lens 31 from detaching.

Figure 6:
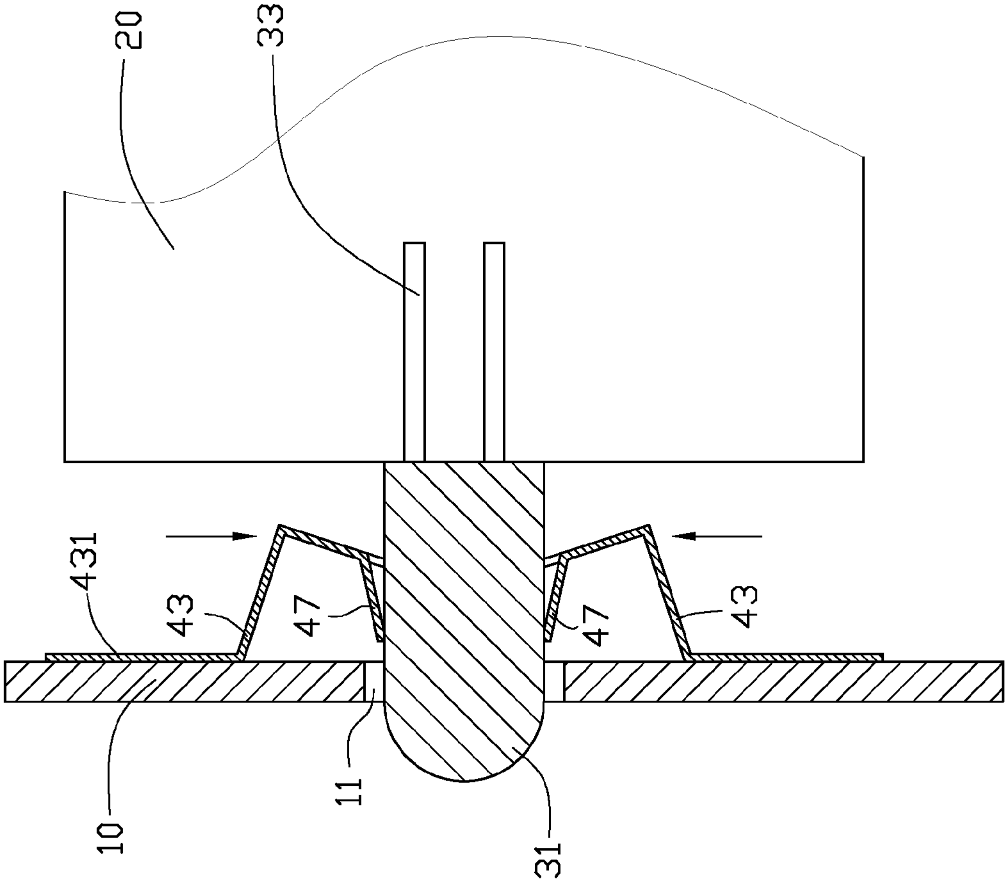
FIG. 6 is similar to FIG. 5, but shows a different state of the electronic device.

Referring to FIG. 6, if repair or replacement of the LED 30 is needed, removal of the LED 30 is achieved by external force pressing two operation portions 43 simultaneously, to deform the main body 41, such that two elastic latch arms 47 rotate relative to the fixing portion 431. When the elastic latch arms 47 is approximately parallel to the surface 311, the lens 31 can be easily detached from the through hole 11, because of a less pressure applied by the elastic latch arms 47. The main body 41 releases the stored energy and recovers to its normal state, when the external force ceases.

In alternative embodiments, the support member 40 may be integrally formed on the housing 10, rendering the fixing portions 431 unnecessary. The operation portions 43 may also be omitted. The number of the operation portions 43, the fixing portions 431, and the elastic latch arms 47 may vary. When there is only one elastic latch arm 47, the LED 30 is clamped by the elastic latch arm 47 and a sidewall of the through hole 11.

It is believed that the present embodiments and their advantages will be understood from the foregoing description, and it will be apparent that various changes may be made thereto without departing from the spirit and scope of the disclosure or sacrificing all of its material advantages.

What is claimed is:

1. An electronic device, comprising:

a housing defining a cavity, and a through hole communicating with the cavity;

a printed circuit board (PCB) received in the cavity;

a light-emitting diode (LED) mounted to the PCB, the LED comprising a lens received in the through hole; and a support member fixed to the housing to provide support for the lens, the support member comprising a main body, two operation portions, and two fixing portions, and an elastic latch arm; the main body defining a positioning hole for receiving the lens, the two fixing portions being positioned on opposite sides of the main body and fixed to the housing; each operation portion coupling the main body and one fixing portion; the elastic latch arm extending from the main body toward the positioning hole and being positioned close to the through hole to form an angle with a surface of the lens, wherein an end of the elastic latch arm contacts the surface of the lens to prevent the lens from being detached from the through hole.

2. The electronic device of claim 1, wherein the two operation portions extend from opposite ends of the main body towards the through hole.

3. The electronic device of claim 2, wherein the two fixing portions extend from two ends of the operation portions away from the main body.

4. The electronic device of claim 1, wherein the support member is made of elastic materials.

5. The electronic device of claim 1, wherein the elastic latch arm comprises a free end having the same shape as the surface of the lens.

6. The electronic device of claim 1, wherein the angle is about 55° to about 65°.

* * * * *